May 22, 1951 W. C. SILVA 2,554,066
CUTTER GANG FOR CELERY HARVESTERS
Filed Jan. 4, 1949 2 Sheets-Sheet 1

Inventor
Willard C. Silva

By Mason, Fenwick & Lawrence
Attorneys

May 22, 1951  W. C. SILVA  2,554,066
CUTTER GANG FOR CELERY HARVESTERS
Filed Jan. 4, 1949  2 Sheets-Sheet 2

Inventor
Willard C. Silva
By Mason, Fenwick & Lawrence
Attorneys

Patented May 22, 1951

2,554,066

UNITED STATES PATENT OFFICE 2,554,066

CUTTER GANG FOR CELERY HARVESTERS

Willard C. Silva, Sarasota, Fla.

Application January 4, 1949, Serial No. 69,121

2 Claims. (Cl. 55—107)

This invention relates to celery harvesters of that type in which the celery stalk is sized in the field by the harvester, to the precise length that will fit a crate, by cutting off the top part of the foliage and severing the tap root, the planes of operation of the top cutter and root cutting means being a constant distance apart while the harvester is drawn along a row of standing celery.

A harvester of the type referred to is disclosed in my Patent No. 2,436,831, granted March 2, 1948, which also shows means for holding the foliage portion of the plant compacted into a more or less firm mass so that it will stand up before the top cutter, ensuring a clean cut.

The tap root must be severed below the zone at which the edible stalks originate, in order to avoid cutting the individual stalks and disintegrating the bunch. However, this creates a problem, for the habit of growth of celery produces a laterally spreading pad of surface roots emanating from the tap root close to the point at which the individual stalks start. The roots are above the plane of severance and therefore remain attached to the sized stalk, requiring to be hand trimmed later in the packing shed.

The general object of the present invention is to provide a cutter gang for celery harvesters which trims the surface roots concurrently with the length sizing operation.

Another object of the invention is to provide a cutter gang, including tap root severing means, and cutting means ahead of said severing means for trimming the surface roots and loosening the ground ahead of the severing means, whereby the latter penetrates the soil so as to come into clean contact with the tap root instead of pushing an unbroken clod between itself and the tap root, thus resulting in a sharp plane of cleavage of the tap root.

Still another object of the invention is to provide a cutter gang in which the cutting edge of the surface root trimming means is in the same plane as the support for the tap root severing means, so that it cuts a path for said support through the ground and through the pad of surface roots.

Other objects of the invention will appear as the following description of a preferred and practical embodiment thereof proceeds.

In the drawings which accompany the following specification and throughout the several figures of which the same reference characters have been used to denote identical parts:

Figure 1:
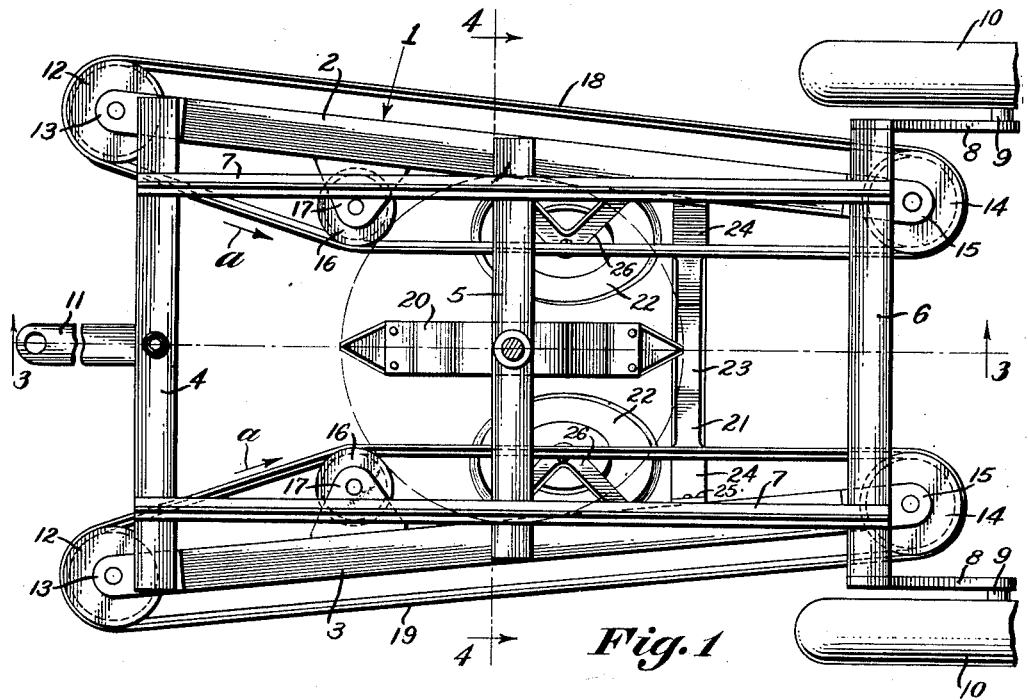
Figure 1 is a plan view of a celery harvester embodying the cutter gang of the present invention, the shaft of the tops cutter being shown in section.
Figure 2:
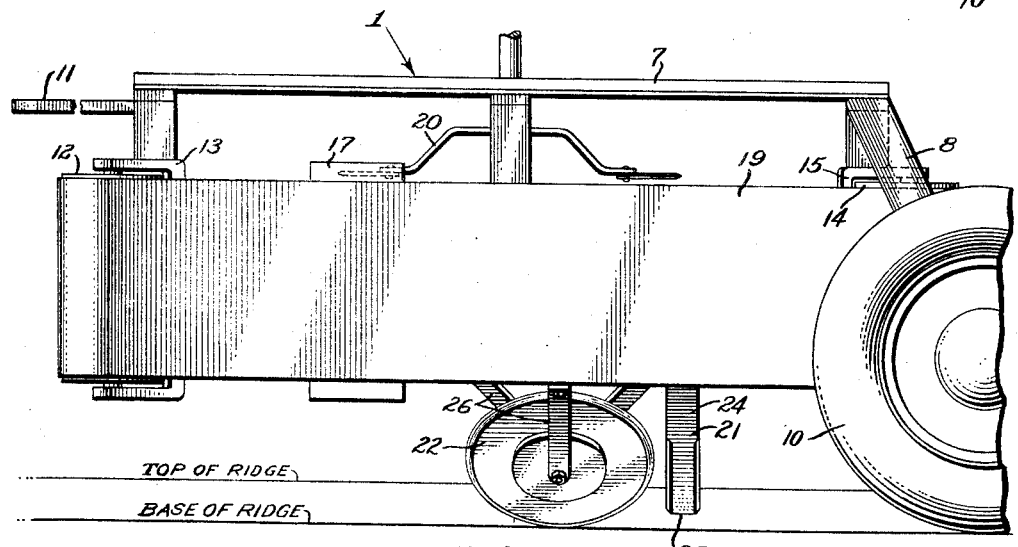
Figure 2 is a side elevation of the apparatus shown in Figure 1.
Figure 3:
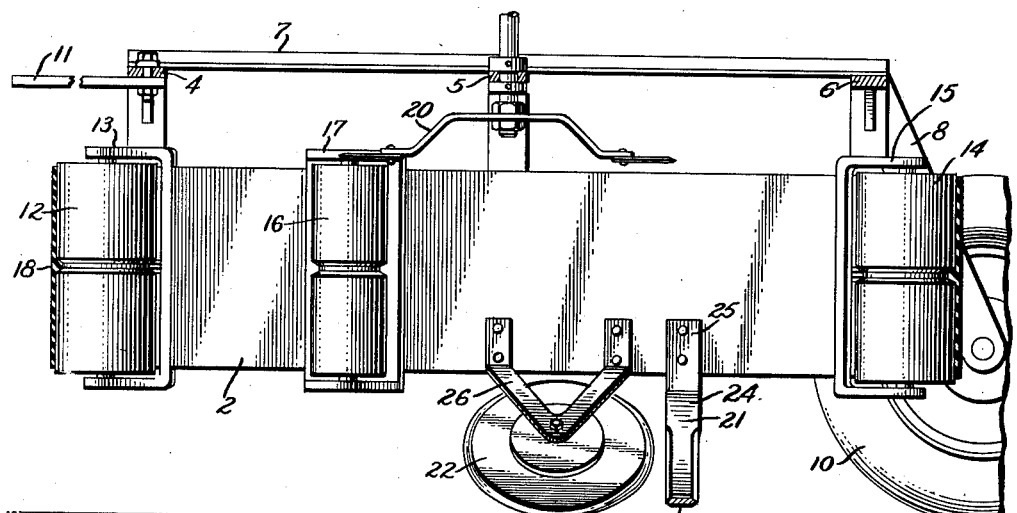
Figure 3 is a longitudinal vertical section taken along the line 3—3 of Figure 1, the inner flight of the compacting belt being omitted.

Referring now to a detailed description of the drawings, the depiction of the harvester per se may be regarded as largely diagrammatic, since it omits operating means for the several instrumentalities, and other details, and is useful in the present disclosure mainly as showing the positional relationship of the cutter gang with respect to the co-related parts of the harvester and as affording support for the cutter gang.

The harvester, as shown, comprises a frame 1, including a pair of longitudinal laterally spaced rearwardly convergent channel beams 2 and 3, joined by cross bars 4, 5 and 6, which are at such height as to clear the celery when the harvester is drawn astride a row of standing celery. Parallel longitudinal tie bars 7 connect the cross bars. The rear cross bar 6 has downwardly extending supports 8 for the stub axles 9 that carry the rear vertical wheels 10. The front cross bar 4 has a hitch 11 at its middle, adapting the harvester to be drawn by a tractor.

Corresponding pulleys rotatable about vertical axes are carried by suitable brackets secured to each of the beams 2 and 3. These comprise the front pulleys 12, journaled in brackets 13 at the forward ends of said beams, the rear pulley 14 journaled in brackets 15 at the rear ends of said beams, and intermediate pulleys 16 journaled in brackets 17 offset inwardly from said beams. Belts 18 and 19 pass about the pulleys, the inner flights of said belts defining between them a celery passage having a wide mouth at the front which converges rearwardly as far as the zone of the intermediate pulleys 16, and proceeds rearwardly therefrom with substantially uniform and relatively narrow width. A rotary tops cutter is shown at 20, journaled in the middle cross bar 5 in a plane above that of the tops of the belts.

The belts are at such height above ground as to embrace the foliage portion of the celery in an intermediate zone, the tops of the foliage sticking above the belts. The arrows a indicate that the belts are driven in such direction as to cause their inner flights to travel contra to the forward movement of the harvester along the row. The foliage is compacted as it passes through the convergent mouth of the celery passage so that it is in a more or less unyielding mass when cut by the tops cutter.

Insofar as the present invention is concerned, the nature of the side walls which define the celery passage is immaterial, since their particular function of compacting the foliage is in cooperation solely with that of the tops cutter.

The cutter gang comprises the tap root cutter 21 and forwardly thereof the coulters 22, which trim the surface roots. These have a definite positional relationship.

The tap rot cutter 21, as shown, is a knife of generally diverted U-shape, having a transverse sharp edged intermediate portion 23 working underground against the tap root, and being relatively short so as to minimize ground resistance, and divergent supporting portions 24, the ground entering parts of which may also be keen. Said supporting portions at their upper ends 25 are secured to the frame beams 2 and 3 of the harvester.

Figure 4:
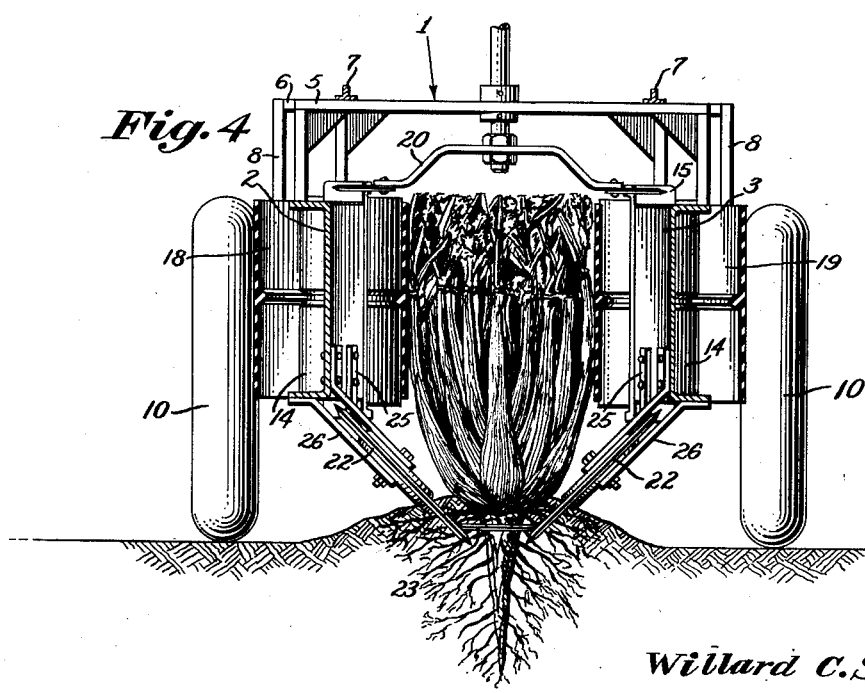
Figure 4 is a vertical cross-section taken along the line 4—4 of Figure 1.

Now it can be readily understood from Figure 4 that the pad of surface roots surrounds the tap root circularly and for some distance so that the advancing tap root cutter would ordinarily run into this pad before it reached the tap root, and as the pad of surface roots is embedded in the ground, the earth would interpose an interference to cutting; the surface roots would be pushed against the tap root and the latter would be torn through by the cutter instead of being cleanly cut.

In order to prevent this undesirable result the coulters 22 are provided. These are carried by bracket members 26, secured to the frame beams 2 and 3, and are angularly arranged to rotate in the same planes as the supporting portions 24 and in advance thereof.

They are freely rotatable, mutually convergent symmetrically with respect to the medial longitudinal vertical plane through the celery passage, and extend to a depth below the cutting plane of the transverse portion 23 of the tap rot cutter. They cut a path in advance for the supporting portion, and since they deliver a rolling cut they do not push, but cleanly sever the surface roots that they encounter.

Since they extend both above and below the transverse portion 23, they loosen the earth traversed by said transverse portion so that it penetrates through the soil and comes into direct engagement with the tap root, making a clean cut. All that remains attached to the sized stalk is the root stubs within the bight portion of the cutter 21, as shown in Figure 4, and the earth that has been loosened drops off of these by the time the stalk is delivered to the field from the rear of the harvester.

Due to the fact that the vehicle wheels 10 and hitch 11 are at extreme opposite ends of the harvester, while the cutter gang is at an intermediate point, the working depth of the latter may be varied through tilting of the harvester by attaching the hitch to a higher or lower point on the tractor. The coulters 22 are preferably mounted as close as possible to the tap root cutter so that tilting of the harvester will not materially alter the relative working depths of the top root cutter and coulters.

While I have in the above description disclosed what I believe to be a preferred and practical embodiment of the invention, it will be understood by those skilled in the art that the specific details of construction and arrangement of parts as illustrated and described are by way of example and not to be construed as limiting the scope of the invention.

What I claim as my invention is:

1. In a harvester for row-planted crops, a root cutter gang comprising a tap root cutting knife extending transversely of said harvester and to a sub-surface depth, a supporting bar for said knife extending inclinedly upward in an outward lateral direction and secured to said harvester, a coulter mounted on said harvester positioned forwardly of said knife said coulter being mounted to rotate substantially in the same longitudinal plane that embraces said supporting bar, and extending to a greater working depth than said knife.

2. In a celery harvester a frame having spaced side walls defining a longitudinal celery passage, a root cutter gang comprising a tap root cutting knife transversely intersecting the medial longitudinal plane of said passage at a sub-surface depth, having upwardly divergent supporting bars extending from its ends and fixed to said frame, and a pair of coulters mounted on said frame positioned forwardly of the knife, symmetrically convergent downward toward said medial longitudinal plane, extending to a greater working depth than said knife so as to converge below said knife, the latter being of such length as to bridge the space between the furrows made by said coulters, said coulters being mounted to rotate substantially in the longitudinal planes that embrace said supporting bars.

WILLARD C. SILVA.

REFERENCES CITED

The following references are of record in the file of this patent:

UNITED STATES PATENTS

| Number | Name | Date |
|---|---|---|
| 690,899 | Smith | Jan. 7, 1902 |
| 1,026,714 | Smith | May 21, 1912 |
| 1,075,939 | Powlison | Oct. 14, 1913 |
| 1,301,330 | Smith | Apr. 22, 1919 |
| 2,436,831 | Silva | Mar. 2, 1948 |